United States Patent [19]
Naito

[11] Patent Number: 4,890,685
[45] Date of Patent: Jan. 2, 1990

[54] DEVICE FOR CONTROLLING DRIVING FORCE DISTRIBUTION IN FOUR-WHEEL DRIVE VEHICLE

[75] Inventor: Genpei Naito, Yokosuka, Japan

[73] Assignee: Nissan Motor Co., Ltd., Yokohama, Japan

[21] Appl. No.: 277,377

[22] Filed: Nov. 29, 1988

[30] Foreign Application Priority Data

Nov. 30, 1987 [JP] Japan ................................ 62-302472

[51] Int. Cl.⁴ .............................................. B60K 17/34
[52] U.S. Cl. .................................... 180/233; 364/424.1
[58] Field of Search ............... 180/233, 247, 248, 249, 180/250, 197; 364/424.1, 426.03

[56]  References Cited
U.S. PATENT DOCUMENTS

| 4,754,834 | 7/1988 | Ozaki | 180/233 |
| 4,773,500 | 9/1988 | Naito et al. | 180/233 |
| 4,776,424 | 10/1988 | Naito | 180/233 |

FOREIGN PATENT DOCUMENTS 61-157437  7/1986  Japan .

Primary Examiner—John A. Pekar
Attorney, Agent, or Firm—Foley & Lardner, Schwartz, Jeffery, Schwaab, Mack, Blumenthal & Evans

[57] ABSTRACT

A driving force distribution control device for a four wheel drive vehicle comprises first computing means for computing a clutch engaging force using a rotational speed differential between front and rear wheels, second computing means for computing a clutch engaging force using only a vehicle speed and third computing means for computing a target clutch engaging force form the sum of the clutch engaging forces computed by the first and second computing means. A transfer clutch variable in engagement for controlling distribution of a driving force to the front and rear wheels is brought into engagement with the target clutch engaging force.

6 Claims, 8 Drawing Sheets

DEVICE FOR CONTROLLING DRIVING FORCE DISTRIBUTION IN FOUR-WHEEL DRIVE VEHICLE

BACKGROUND OF THE INVENTION

1. Field of the Invention

The present invention relates in general to four wheel drive vehicles and more particularly to a device for controlling driving force distribution in a four-wheel drive automotive vehicle.

2. Description of the Prior Art

A prior art device for the above described control is disclosed in the Japanese Provisional Patent Publication No. 61-157437.

The prior art device is constrcuted so as to calculate the rotational speed differential between the front and rear wheels based on signals produced by the front and rear wheel rotational speed sensors and to increase the clutch engaging force as the rotational speed differential between the front and rear wheels increases, i.e., as the driving wheel slip increases, whereby to change the driving mode for the four-wheel drive and prevent the driving wheel slip promptly. Further, the prior art device is constructed so that its control constant causes the steering characteristic during cornering to become neutral steer when the vehicle speed ranges from low to middle.

The prior art device has the following problems.

(1) The running stability of the vehicle at the time of lane change or when subjected to a small disturbance is rather bad since the clutch is brought into engagement with some delay after occurence of the rotational speed differential between the front and rear wheels even during high speed straightahead running of the vehicle.

(2) While weak understeer is desirable during high speed cornering, the cornering or turning characteristic effected by the prior art device is neutral steer, thus resulting in that the driver needs to take good care in operating the steering wheel during high speed cornering.

(3) If a greater importance is given to the control of the clutch engaging force upon high speed running in order to solve the above problems (1) and (2), the running stability during low to middle speed running is deteriorated.

SUMMARY OF THE INVENTION

In accordance with the present invention, there is provided an improved driving force distribution control device for a four-wheel vehicle. The vehicle having a drive train for transmitting a driving force from an engine to front and rear wheels.

The control device comprises clutch means disposed in the drive train and variable in engagement in response to a clutch engaging force supplied threreto for varying distribution of the driving force to the front and rear wheels, first detecting means for detecting a rotational speed differential between the front and rear wheels and producing a signal representative thereof, second detecting means for detecting a vehicle speed and producing a signal representative thereof, and clutch control means for controlling the above described clutch engaging force in response to the signals from the first and second detecting means. The clutch control means includes first computing means for computing a clutch engaging force using a rotational speed differential between the front and rear wheels, second computing means for computing a clutch engaging force using only a vehicle speed and third computing means for computing a target clutch engaging force from the sum of the clutch engaging forces computed by the first and second computing means.

The above structure is effective for overcoming the above noted problems inherent in the prior art device.

It is accordingly an object of the present invention to provide an improved driving force distribution device for a four wheel drive vehicle which can attain all of the low to middle speed accelerated running stability, low to middle speed decelerated running stability, high speed straightahead running stability and optimal steering characteristic during high speed cornering.

It is a further object of the present invention to provide animproved driving force distribution device of the above described character which can attain the excellent turning ability during low to middle speed running.

DESCRIPTION OF THE PREFERRED EMBODIMENTS

Figure 1:
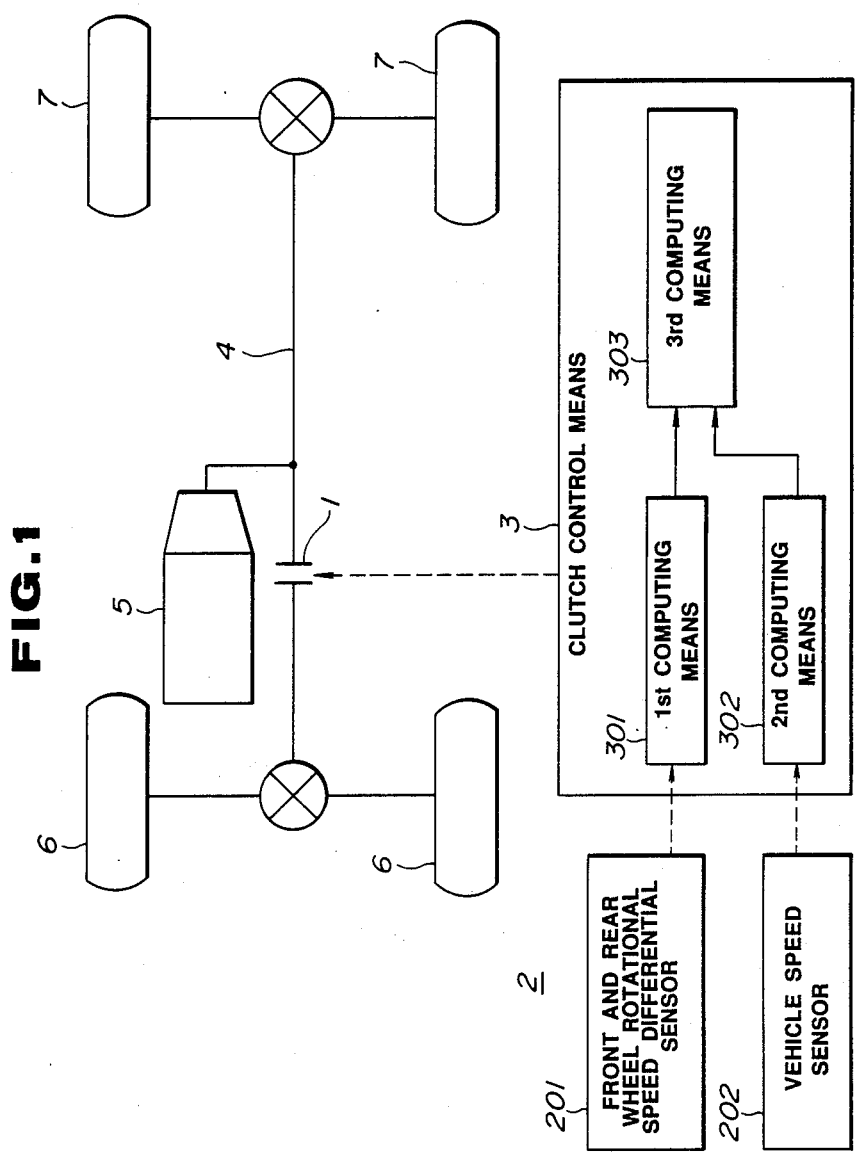
FIG. 1 is a diagramatic view of a driving force distribution control device for a four wheel drive vehicle according to an embodiment of the present invention.
Figure 2:
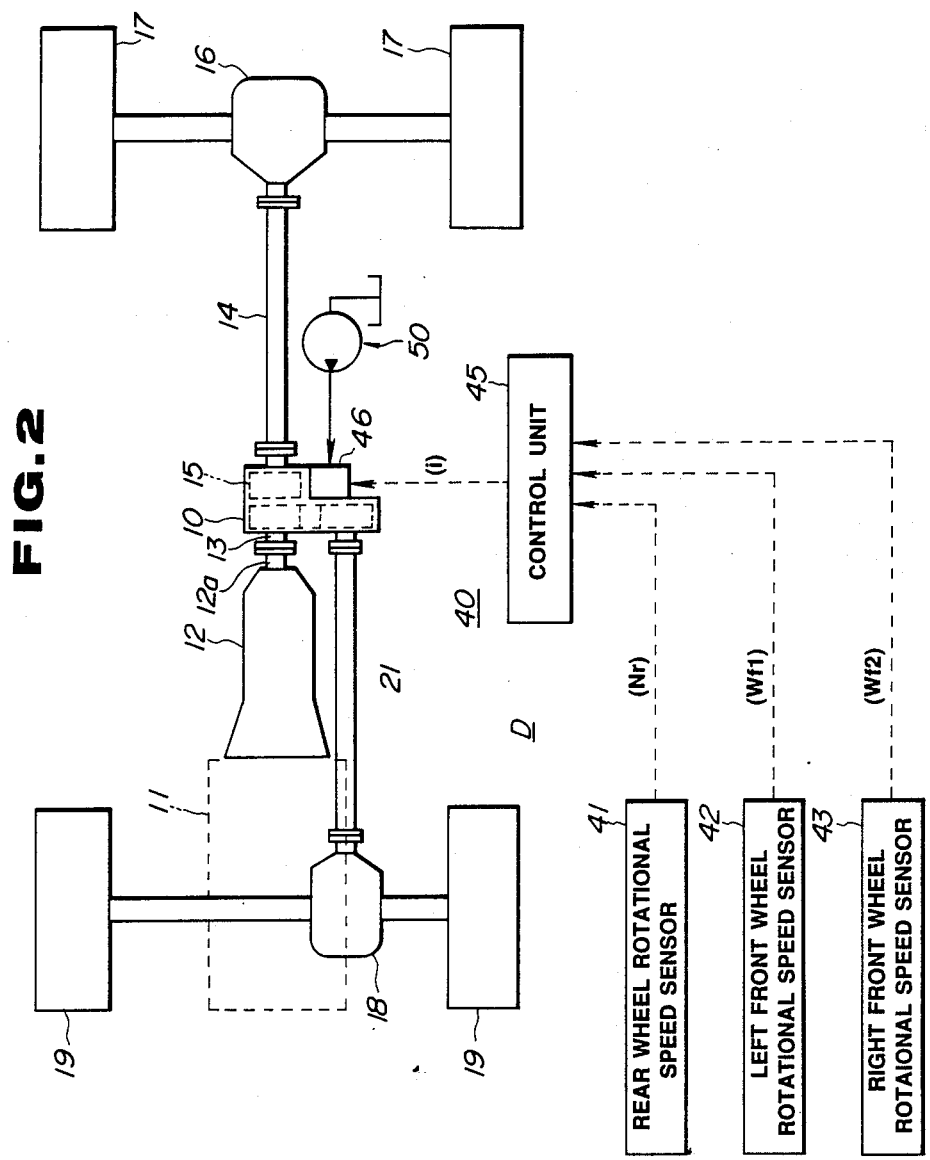
FIG. 2 is a schematic view of a driving force distribution control device for a four wheel drive vehicle according to another embodiment of the present invention.

Referring to FIG. 1, a driving force distribution control device for a four wheel drive vehicle according to an embodiment of the present invention is disposed in a drive train 4 for transmitting a driving force from an engine 5 to front and rear wheels 6 and 7. The control device consists of a clutch means 1 for distributing a driving force from the engine 5 to the front and rear wheels 6 and 7, a detecting means 2 for detecting a vehicle running condition and producing a signal representative thereof, and a clutch control means 3 responsive to the signal from the detecting means 2 for producing a control signal for controlling increase and decrease of a clutch engaging force. The detecting means 2 includes a front and rear wheel rotational speed differential detecting means 201 and a vehicle speed detecting means 202. The clutch means 3 includes a first computing means 301 for computing a clutch engaging force using a rotational speed differential between the front and rear wheels, a second computing 302 means for computing a clutch engaging force using only a vehicle speed, and a third computing means 303 for computing a target clutch engaging force from the sum of the computation results by the first and second computing means 301 and 302.

In operation, the target clutch engaging force is computed by the third computing means 303 using the clutch engaging force which is computed by the first computing means 301 using the rotational speed differential between the front and rear wheels during low to middle speed coasting (running at constant speed), accelerated running and decelerated running.

Accordingly, a good cornering or turning ability can be attained during coasting and accelerated running, and a good running stability can be attained during decelerated running.

During high speed running, a target clutch engaging force is computed by the third computing means 303 from the sum of the clutch engaging force which is computed by the first computing means 301 using the rotational speed differential between the front and rear wheels and the clutch engaging force which is computed by the second computing means 302 using the vehicle speed.

Accordingly, the clutch is brought into engagement prior to occurence of the rotational speed differential between the front and rear wheels, thus making it possible to attain a good running stability of the vehicle at the time of lane change or when subjected to a small disturbance. Further, during high speed cornering, weak understeer which effects a low vehicle head turning ability is attained by the clutch enagement controlled in accordance with the vehicle speed, thus making it possible for the driver to operate the steering wheel with ease even during high speed cornering.

Referring to FIGS. 2 to 12, the driving force distribution device is generally indicated by the reference character "D" and installed on a four wheel drive vehicle having a transfer mechanism or transfer 10, engine 11, transmission 12, transfer input shaft 13 directly connected to the output shaft 12a of the transmission 12, rear wheel side drive shaft 14, multi-disc friction clutch 15, rear differential 16, a pair of left and right rear wheels 17 and 17, front differential 18, a pair of left and right front wheels 19 and 19, gear train 20 and front wheel side drive shaft 21.

The multi-disc friction clutch 15 is disposed between the transfer input shaft 13 directly connected to the front wheel drive shaft 21 through the gear train 20 and the rear wheel side drive shaft 14 so that the troque transmitted to the front wheels 19 and 19 can be variably controlled by controlling a clutch operating fluid pressure.

Figure 3:
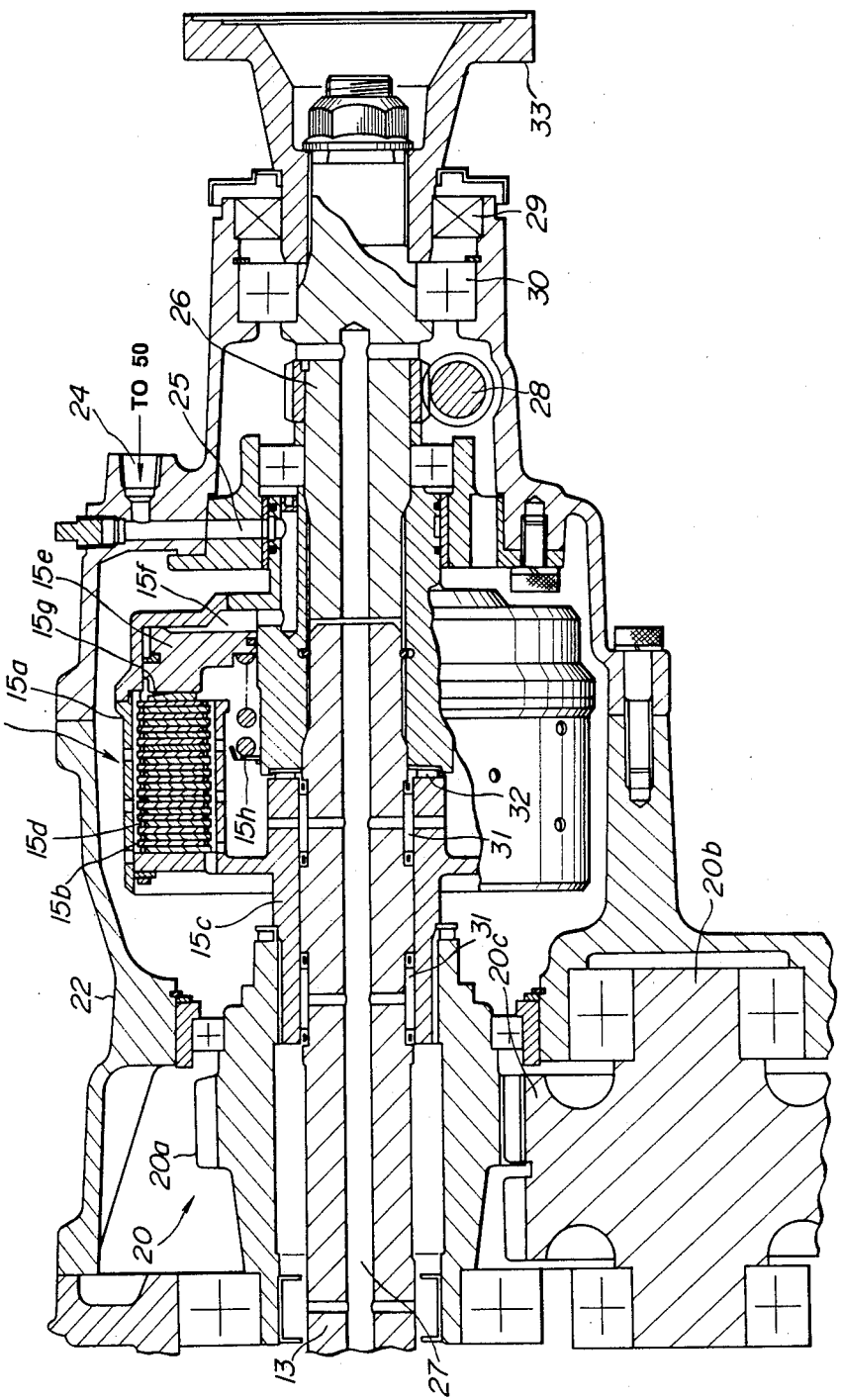
FIG. 3 is a fragmentary sectional view of a transfer employed in the emboidment of FIG. 2.

A specific example of the transfer 10 is shown in FIG. 3. In this example, the transfer 10 includes a transfer case 22 within which the multi-disc friction clutch 15, gearing and shafting are disposed.

The transfer clutch 15 includes a clutch drum 15a fixed to the transfer input shaft 13 and the rear wheel side drive shaft 14, friction plates 15b engaged with the clutch drum 15a so as to prevent relative rotation therebetween, a clutch hub 15c rotatably mounted on the transfer input shaft 13, friction discs 15d engaged with the clutch hub 15c so as to prevent relative rotation therebetween and alternated with the friction plates 15b, a clutch piston 15e provided at one side of the alternating friction plates and discs 15b and 15d, and a cylinder chamber 15f formed between the clutch piston 15e and the clutch drum 15a.

The gear train 20 of the transfer 10 includes a first gear 20a provided to the clutch hub 15c of the transfer clutch 15, a second gear 20c provided to an intermediate shaft 20b, and a third gear 20d provided to the front drive shaft 21. When the transfer clutch 15 is engaged, the driving force or torque is transmitted through the transfer clutch 15 and the gear train 20 to the front drive shaft 21 for driving the front wheels 19 and 19.

The transfer 10 further includes a dish plate 15g, a return spring 15h, a clutch operating fluid inlet port 24, a clutch operating fluid passage 25, a rear wheel side output shaft 26, a lubrication oil passage 27, a pinion for a speedometer 28, an oil seal 29, a bearing 30, a needle bearing 31, a thrust bearing 32 and a coupling flange 33 for connecting the output shaft 26 to the rear wheel side drive shaft 14.

Figure 4:
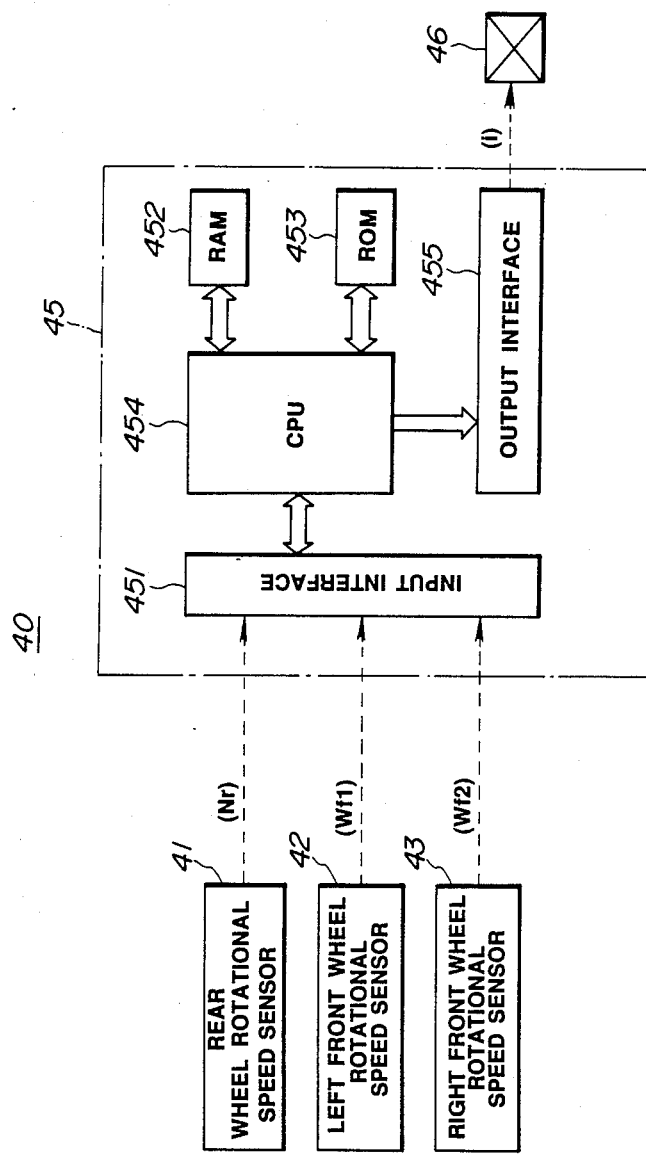
FIG. 4 is a block diagram of a control unit employed in the embodiment of FIG. 2.

A fluid pressure controller 40 for supplying a clutch operating fluid pressure to the multi-disc friction clutch 15 for engagement thereof is, as shown in FIG. 4, provided with a rear wheel rotational speed sensor 41, left front wheel rotational speed sensor 42 and right front wheel rotational speed sensor 43. The controller 40 is further provided with a control unit 45 and a relief valve 46 of an electromagnetically proportional type, i.e., of the type of which degree of opening varies with variation of electromagnetic force.

The sensor 41 is installed in place on the rear wheel side drive shaft 14 whilst the sensors 42 and 43 are insatalled in place adjacent the left and right front wheels 19 and 19, respectively. Though not shown, each sensors may, for example, be of the type as a rotational sensor consisting of a sensor rotor fixed to a shaft for measurement of rotational speed and a pickup for detecting an electromagnetic variation caused by variation in rotation of the sensor rotor. The sensors 41, 42 and 43 produce signals Nr, wf1 and wf2 representative of the rotational speeds of the respective vehicle wheels which are proportional to the rotational speeds of the shafts on which the sensors are respectively installed.

Figure 5:
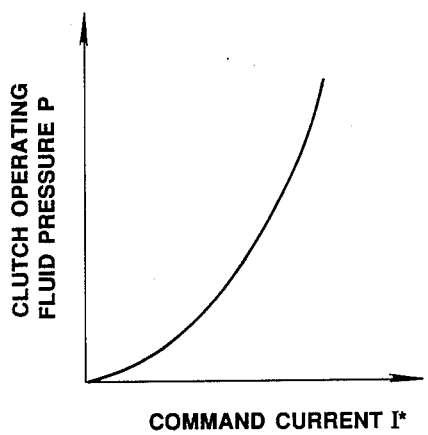
FIG. 5 is a graph depicting a relation between a clutch operating fluid pressure and a clutch engaging force.
Figure 6:
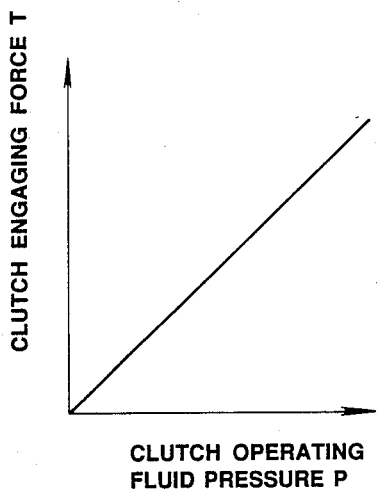
FIG. 6 is a graph depicting a relation between a command current and a clutch operating fluid pressure.

The control unit 45 consists of a control circuit including a microcomputer installed on the vehicle body. The control circuit includes an input interface 451, RAM 452, ROM 453, CPU 454 and output interface 455. The relief valve 46 is operated in response to a command current singal "i" from the control unit 45 in such a way that the clutch operating fluid pressure P=0 is attained in response to the command current I*=0 and that the relief valve 46 moves toward its closed position in response to the command current I*>0, whereby the fluid pressure from a fluid pressure source 50 is adjusted to a clutch operating fluid pressure "P" corresponding to the command current I* through control of the quantity of fluid drained (FIG. 5).

The relation between the clutch operating fluid pressure "P" and the clutch engaging force T is given by the following formula, $$P = T/(u \cdot S \cdot 2n \cdot Rm)$$

where u is the friction coefficient of the friction discs 15*b* and 15*d*, S is the pressure acting area of the piston 15*e*, n is the number of the friction discs 15*b* and 15*d* and Rm is the effective torque transmitting radius of the friction discs 15*b* and 15*e*. From this formula, it will be apparent that the clutch engagement force T increases with increase of the clutch operating fluid pressure.

The operation of the driving force distribution control device will now be described.

Figure 7:
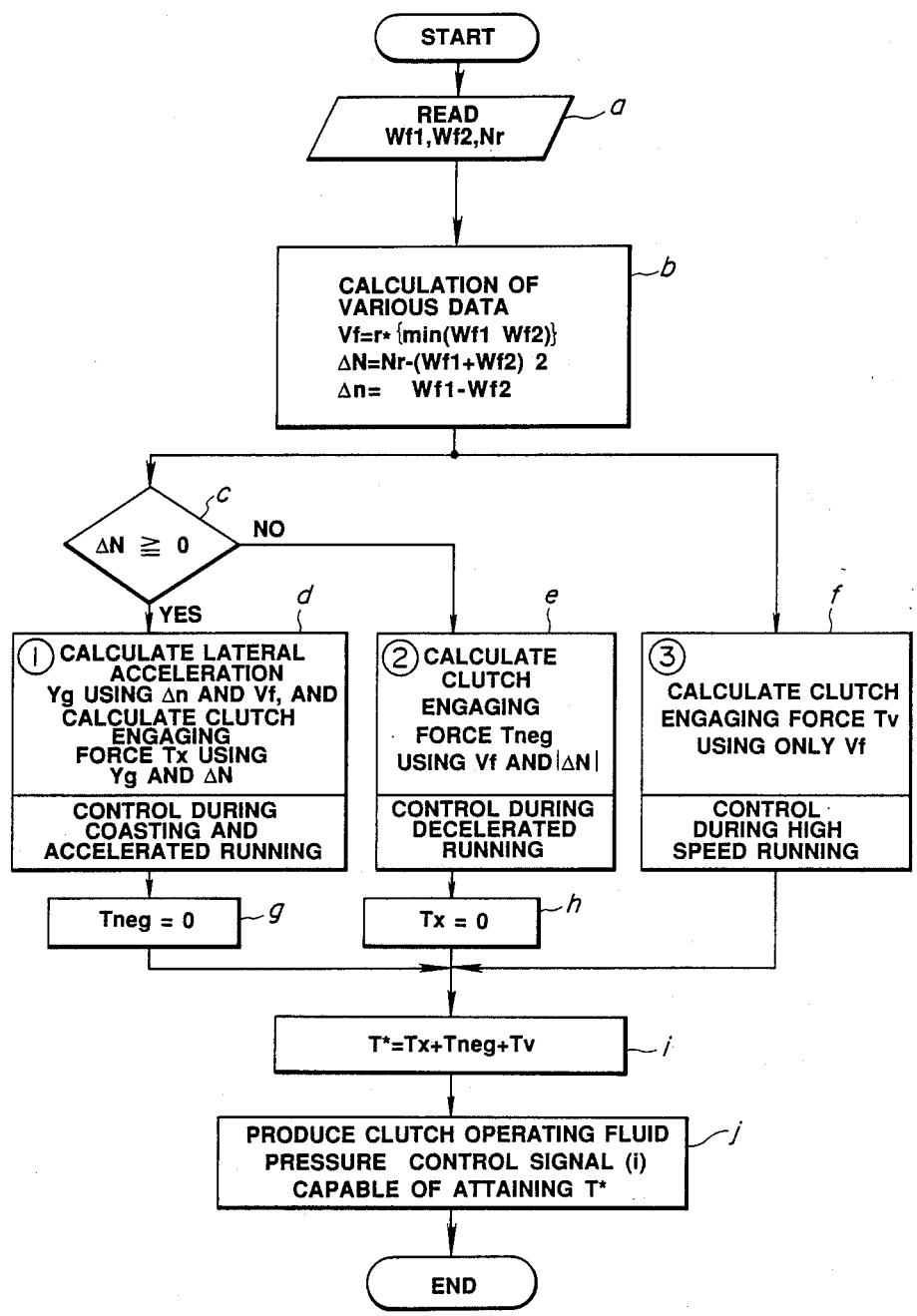
FIG. 7 is a flow chart depicting a driving force distribution control routine of the control unit of FIG. 4.

Reffering first to FIG. 7, the general control of driving force distribution will be described.

At the step "a", the left front wheel rotational speed Wf1, right front wheel rotational speed Wf2 and rear wheel rotational speed Nr detected by the respective sensors 41, 42 and 43 are read and stored.

At the step "b", the vehicle speed Vf, front and rear wheel rotational speed differential $\Delta N$ and left and right front wheel rotation speed differential $\Delta n$ are calculated using the left front wheel rotational speed Wf1 and right front wheel rotational speed Wf2 read at the step "a" and using the tire radius r.

The vehicle speed Vf is calculated using the smaller one of the left and right front wheel rotation speeds Wf1 and Wf2 and the tire radius r from the following formula.

$$Vf = r * \{min (Wf1 \cdot Wf2)\},$$

The vehicle speed Vf may be calculated using the average of the left and right front wheel rotational speeds Wf1 and Wf2 or may be obtained by direct measurement of an absolute vehicle speed.

The front and rear wheel rotation speed differential $\Delta N$ is calculated using the rear wheel rotational speed Nr and the average of the front wheel rotational speeds Wf1 and Wf2 from the following formula.

$$\Delta N = Nr - \{(Wf1 + Wf2)/2\}$$

The front and rear wheel rotational speed differential $\Delta N$ may be obtained by direct measurement of the front and rear wheel rotational speed differential.

The left and right front wheel rotational speed differential $\Delta n$ is calculated using the left front wheel rotational speed Wf1 and the right front wheel rotational speed Wf2 from the following formula.

$$\Delta n = |wf1 - wf2|$$

The left and right front wheel rotation speed differential $\Delta n$ is used for calculating the turning or cornering curve radius R and the lateral acceleration Yg. The cornering curve radius R may be obtained from the steer angle $\theta$, and the lateral acceleration Yg may be directly detected using a lateral acceleration sensor or the like.

At the step "c", it is determined whether the front and rear wheel rotation speed differential $\Delta N$ obtained at the step "b" is equal to or larger than zero, i.e., $\Delta N = 0$ or $\Delta N < 0$.

From the step "b" onward, two control processings are performed in parallel, i.e., one control processing proceeds to the step "d" (control during coasting and accelerated running) or the step "e" (control during decelerated running) selectively based on the determination at the step "c" whilst the other control processing proceeds to the step "f" (control during high speed running).

Figure 8:
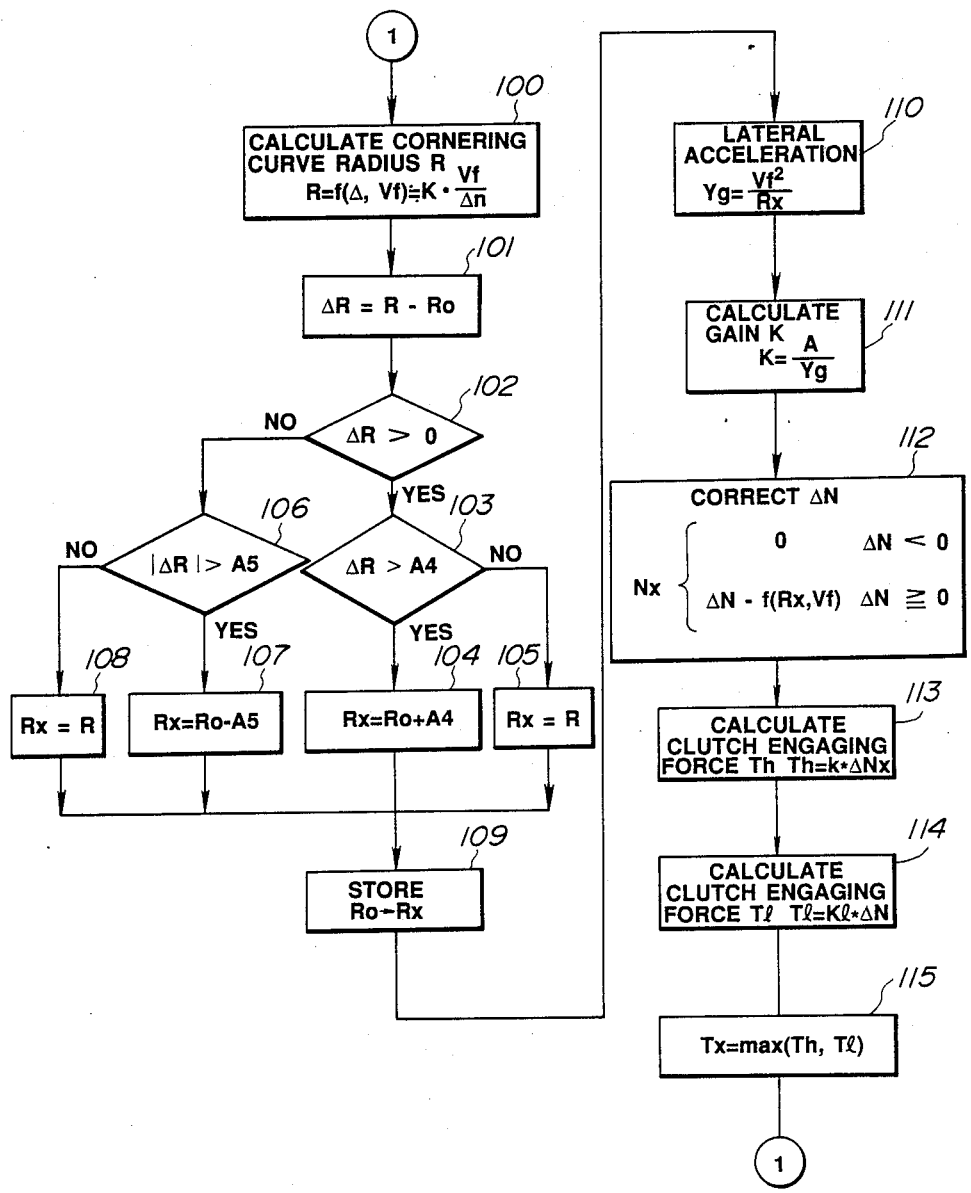
FIG. 8 is a flow chart depicting a control routine of the control unit of FIG. 4 during coasting (running at constant speed) and accelerated running.

At the step "d" for the control during coasting and accelerated running, the lateral acceleration Yg is first calculated using the left and right front wheel rotational speed differential $\Delta n$ and the vehicle speed Vf, and then the clutch engaging force Tx is calculated using the lateral acceleration Yg and the front and rear wheel rotational speed differential $\Delta N$. The details of the processing content 1 are shown in FIG. 8 and will be described hereinafter with reference thereto.

Figure 9:
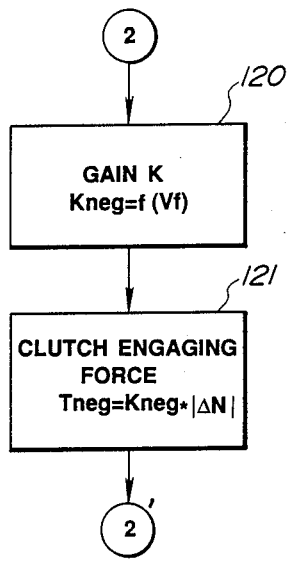
FIG. 9 is a flow chart depicting a control routine of the control unit of FIG. 4 during decelerated running.
Figure 10:
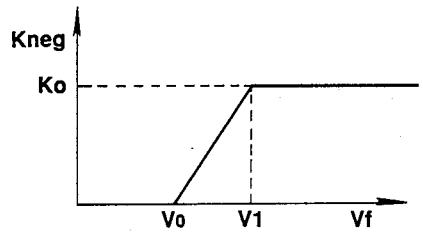
FIG. 10 is a graph depicting a characteristic of gain for vehicle speed.
Figure 11:
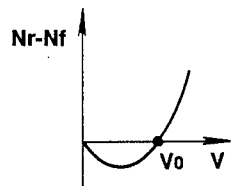
FIG. 11 is a graph depicting a characteristic of rotational speed differential between front and rear wheels for vehicle speed.

At the step "e" for the control during decelerated running, the clutch engaging force Tneg is calcuated using the vehicle speed Vf and the absolute value of the front and rear wheel rotational speed differential $|\Delta N|$. The details of the processing content 2 at the step "d" are shown in FIGS. 9 to 11 and will be described hereinafter with reference thereto.

Figure 12:
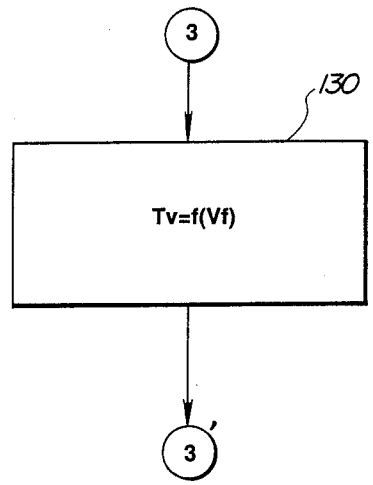
FIG. 12 is a flow chart of a control routine of the control unit of FIG. 4 during high speed running.
Figure 13:
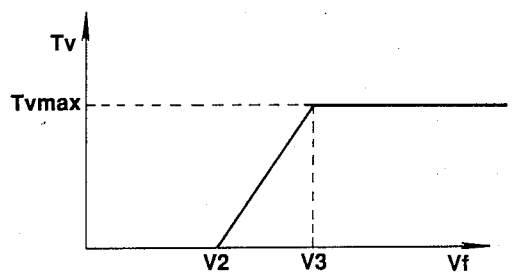
FIG. 13 is a graph depicting a characteristic of clutch engaging force for vehicle speed.

At the step "f" for the control during high speed running, the clutch engagement force Tv is calculated using only the vehicle speed Vf. The details of the processing content 3 are shown in FIGS. 12 and 13 and will be described hereinafter with reference thereto.

At the steps "g" and "h", the clutch engaging forces Tx and Tneg are set to be 0 (zero).

At the step "i", the target clutch engaging force T* is calculated.

The target clutch engagement force T* is obtained from the sum of the clutch engagement forces Tx, Tneg and Tv from the following formula.

$$T* = Tx + Tneg + Tv$$

At the step "j", a clutch operating fluid pressure control signal "i" capable of attaining the target clutch engagement force T* is produced by the relief valve 46.

The processing content 1 at the step "d" for the control during coasting and accelerated running will be described with reference to the flow chart of FIG. 8.

At the step 100, the cornering curve radius R is calculated using the various data obtained at the step "b" from the following formula.

$$R = f(\Delta n \cdot Vf) \approx K \cdot \frac{Vf}{\Delta n}$$

At the succeeding steps 101 to 109, it is realized a low-pass filter for limiting the variation speed at which the rated increase of the cornering curve radius R is increased or decreased.

At the step 101, a cornering curve radius variation $\Delta R$ to a unit time is calculated using the cornering curve radius R obtained at the step 100 and the cornering curve radius $R_o$ obtained at the previous control cycle.

At the step 102, it is determined whether $\Delta R$ is positive or negative and thereby determining whether the cornering curve radius R is increasing or decreasing.

When $\Delta R$ is determined negative at the step 102, i.e., the cornering curve radius R is increasing, it is then determined at the step 103 whether the amount of variation is larger than a predetermined value A4. The predetermined value A4 becomes the criteria of the low-pass filter when the cornering curve radius R is increasing.

When $\Delta R$ is determined larger than A4 at the step 103, the control processing proceeds to the step 104 to perform filtering and calculate the turning radius Rx from the formula $Rx = R_o + A4$.

Further, when $\Delta R$ is determined smaller than A4 at the step 103, the control processing proceeds to the step 105 to set the calculated cornering curve radius R as the cornering curve radius Rx without making any modification thereto.

On the other hand, when ΔR is determined negative at the step 102, i.e., the cornering curve radius R is decreasing, it is determined whether the amount of variation is larger than a predetermined value A5. The predetermined value A5 becomes the criteria for the low-pass filter when the cornering curve raidius is decreasing. In the meantime, the set value A5 is larger than the set value A.

When |ΔR| is determined larger than A5 at the step 106, the control processing proceeds to the step 107 to perform filtering and calculate the turning radius Rx from the formula Rx=R−A5.

When |ΔR| is determined smaller than A5 at the step 106, the control processing proceeds to the step 108 to set the calculated cornering curve radius R as the cornering curve radius Rx without making any modification thereto.

At the step 109, the cornering curve radius Rx obtained at the latest control cycle is stored as $R_o$ for calculating ΔR.

At the step 110, the lateral acceleration Yg is calculated using the cornering curve radius Rx processed by the low-pass filtering and the vehicle speed Vf from the following formula.

$$Yg = \frac{Vf^2}{Rx}$$

At the step 111, a proportional coefficient (gain) k is calculated using the above lateral acceleration Yg from the following formula.

$$K = \frac{A}{Yg}$$

At the step 112, a correction value ΔNx is obtained for correction of the front and rear wheel rotational speed differential ΔN obtained at the step "b".

In this connection, when the front and rear wheel rotational differential ΔN is smaller than zero, i.e., ΔN<0, it is determined that the vehicle is turning a tight corner and it is set that ΔNx=0. When ΔN=0, the correction value ΔNx is calculated from ΔNx=ΔN−f (Rx·Vf) so as to perform correction corresponding to the turning locus or cornering curve.

At the setp 113, the clutch enaging force Th (=K·ΔNx) is calculated using the above described proportional coefficient K and the correction value ΔNx.

At the step 114, the clutch engaging force Tl (=K·ΔN) is calculated from a predetermined proportional coefficient Kl and the front and rear wheel rotational speed differential ΔN.

At the step 115, larger one of the above described clutch engaging forces Th and Tl is selected as the clutch engaging force Tx.

That is, When Th ≧ Tl,   Tx = Th when Th < Tl,   Tx = Tl

Thus, the clutch engaging force Tx becomes generally equal to the clutch engaging force Th that is obtained by processing the proportional coefficient K by filtering. The proportional coefficient K is indirectly determined from the lateral acceleration Yg by processing the turning radius R by filtrin. However, the clutch engaging force Tx is at least larger than a predetermined clutch enaging force Tl which is determined by experiments so as not to become an extremely small value.

The processing content 2 at the step "e" for the control during decelerated running is described with reference to flow chart of FIG. 9.

At the step 120, the gain Kneg is obtained from the function of the vehicle speed Vf.

The gain Kneg, as shown in FIGS. 10 and 11, is equal to zero, i.e., Kneg=0 until the vehicle speed V where the front and rear wheel rotational speed differential ΔN changes from negative to positive. At the vehicle speed from $V_o$ to V1, the gain Kneg increases gradually from 0 to $K_o$, i.e., Kneg=0~$K_o$. At the vehicle speed exceeding V1, kneg is equal to $K_o$, i.e., Kneg=$K_o$.

At the step 121, the clutch engaging force Tneg is calculated using the gain Kneg obtained at the step 200 and the absolute value of the front and rear wheel rotational speed differential |ΔN| fron the following formula.

Tneg=Kneg*|ΔN|

The processing content 3 at the step "f" for the control during high speed running will be described with reference to the flow chart of FIG. 12.

At the step 130, the clutch engaging force Tv is calculated using the function of only the vehicle speed vf from the following formula.

Tv=f (Vf)

The function of the vehicle speed f(Vf) is such one as shwon in FIG. 13. Since a main object of increasing the clutch engaging force in response to vehicle speed resides in attaining the running stability at high speed, the vehicle speed V2 which is a minimum vehicle speed for allowing the clutch engaging force Tv to become equal to or larger than zero is about 80 Km/h whilst the vehicle speed V3 at which the clutch engaging force Tv reaches the maximum clutch engaging force Tvmax is about 120 km/h such that the function of the vehicle speed does not affect the vehicle cornering ability at low to middle speed.

Further, the maximum clutch engaging force Tvmax is of such a value that is capable of ataining the high speed running stability and that is sufficient for making the steering characteristic during accelerated cornering to become weak understeer.

The operation during running will now be described.

(I) During low to middle speed coasting and accelerated running

For example, during low to middle speed coasting and accelerated running, i.e., coasting and acclerated running at the speed equal to or lower than 80 km/h, the target clutch engaging force T* is determined mainly based on the clutch engaging force Tx. Accordingly, an excellent cornering ability is attained.

(II) During decelerated running

During decelerated running, the target clutch engaging force T* is determined mainly based on the clutch engaging force Tneg unless at high speed.

Accordingly, a high decelerated running stability is attained.

(III) During high speed running

During high speed running, for example, at the speed higher than 80 km/h, the target clutch engaging force T* is calculated mainly from the sum of the clutch engaging force Tx and the clutch engaging force Tv.

Accordingly, since during high speed straightahead running the multi-disc friction clutch is brought into engagement prior to occurence of the front and rear wheel rotational speed differential ΔN, a high running stability of the vehicle at the time of lane cange or when subjected to a small disturbance is attained.

Further, since weak understeer is attained by the clutch engagement responsive to the vehicle speed during high speed cornering, it becomes possible for the driver to operate the steering wheel with ease.

From the foregoing, it will be understood that a driving force distribution device "D" for a four wheel drive vehicle is adapted to obtain a target clutch engaging force T* from the sum of a clutch enagaging force Tx or Tneg obtained based on only a front and rear wheel rotational speed differential ΔN and a clutch engaging force Tv obtained based on only a vehicle speed Vf, thus making it possible to attain all of an accelerated and decelerated running stability at low to middle speed and an optimal steering characteristic during high speed straightahead running.

In the meantime, during actual running of the vehicle, it is rare that the running conditions (I) to (III) are clearly separated from each other but exist compositely. However, by the sum of the clutch engaging forces under the respective conditions, it becomes possible to allow one running condition factor to be compensated for by another running condition factor for thereby attaining the stability.

While the present invention has been described and shown as above, it is not limitative. For example, while the electromagnetically proportional relief valve has been employed as an actuator for controlling a clutch operating fluid pressure, it may be replaced by other means, for example, a solenod controlled valve when a duty control signal is used.

Further, while the multi-disc friction clutch has been employed as the clutch means, it may be an electromagnetic clutch, viscous clutch or the like.

What is claimed is:

1. A driving force distribution control device for a four wheel drive vehicle having a drive train for transmitting a driving force from an engine to front and rear wheels of the vehicle, comprising:
   clutch means disposed in said drive train and variable in engagement in response to variation of a clutch engaging force supplied thereto for varying distribution of said driving force to said front and rear wheels;
   first detecting means for detecting a rotational speed differential between said front and rear wheels and producing a signal representative thereof;
   second detecting means for detecting a vehicle speed and producing a signal representative thereof; and
   clutch control means for controlling said clutch engaging force in response to said signals from said first and second detecting means, said clutch control means having first computing means for computing a clutch engaging force using a rotational speed differential between said front and rear wheels, second computing means for computing a clutch engaging force using only a vehicle speed and third computing means for computing a target clutch engaging force from the sum of said clutch engaging forces computed by said first and second computing means.

2. The control device as set forth in claim 1 further comprising actuating means for supplying said target clutch engaging force to said clutch means in response to a signal produced by said clutch control means and representative of said target clutch engaging force.

3. The control device as set forth in claim 2 wherein said clutch engaging force computed by said first computing means increases with increase of said rotational speed differential between said front and rear wheels, and said clutch engaging force computed by said second computing means increases with increase of said vehicle speed.

4. A driving force distribution control device for a four wheel drive vehicle comprising:
   a transfer mechanism for transmitting a driving force from an engine to front and rear wheels, said transfer mechanism including a transfer clutch variable in engagement depending on variation of a clutch engaging force supplied thereto for varying distribution of said driving force to said front and rear wheels;
   an actuator for supplying said clutch engaging force to said transfer clutch;
   a rear wheel rotational speed sensor for sensing a rear wheel rotational speed and producing a signal representative thereof;
   a first front wheel rotational speed sensor for sensing a rotational speed of one of said front wheels;
   a second front wheel rotational speed sensor for sensing a rotational speed of the other of said front wheels;
   a controller for controlling said actuator in response to said signals from said rear wheel rotational speed sensor and said first and second front wheel rotational speed sensors, said controller including means for computing a vehicle speed using smaller one of said front wheel rotational speeds, means for computing a rotational speed differential between said front and rear wheels using said rear wheel rotational speed and the average of said front wheel rotational speeds, means for computing a rotational speed differential between said front wheels using said front wheel rotational speeds, means for computing a lateral acceleration using said rotational speed differential between said front wheels and then computing a clutch engaging force component using said lateral acceleration and said rotational speed differential between said front and rear wheels when said rotational speed differential between said front and rear wheels is equal to or larger than zero, means for computing a clutch engaging force component using said vehicle speed and said rotational speed differential between said front and rear wheels when said rotational differential is smaller than zero, means for computing a clutch engaging force component using only said vehicle speed, means for computing a target clutch engaging force from the sum of said clutch engaging force components, and means for producing a singal for allowing said actuator to supply said target clutch engaging force to said transfer clutch.

5. The control device as set forth in claim 4 wherein said first and second mentioned clutch engaging force components increase with increase of said rotational speed differential between said front and rear wheels, and said third mentioned clutch engaging force component increases with increase of said vehicle speed.

6. The control device as set forth in claim 4 wherein said transfer clutch is of the type operated by a fluid pressure, and said actuator includes a source of fluid pressure and a relief valve for controlling the fluid pressure to be supplied to said transfer clutch through control of a quantity of fluid drained.

* * * * *